Figure 7:
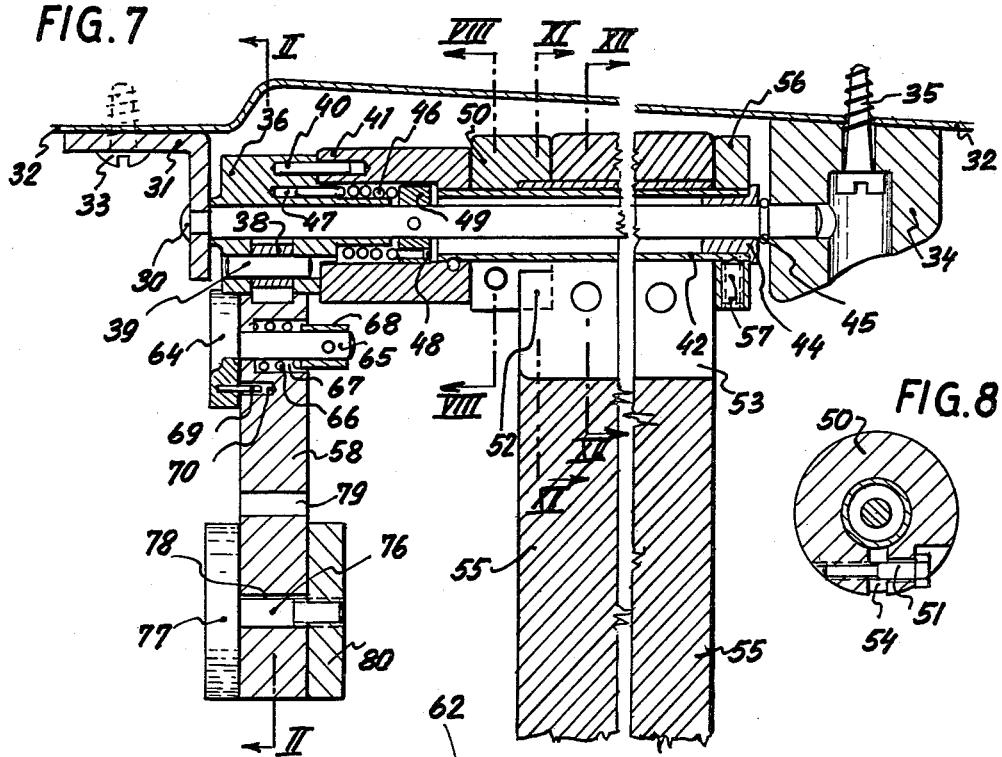

Jan. 21, 1964    H. VON WIMMERSPERG    3,118,700
SHOCK ABSORBING CRASH PAD
Filed Feb. 24, 1961    3 Sheets-Sheet 1
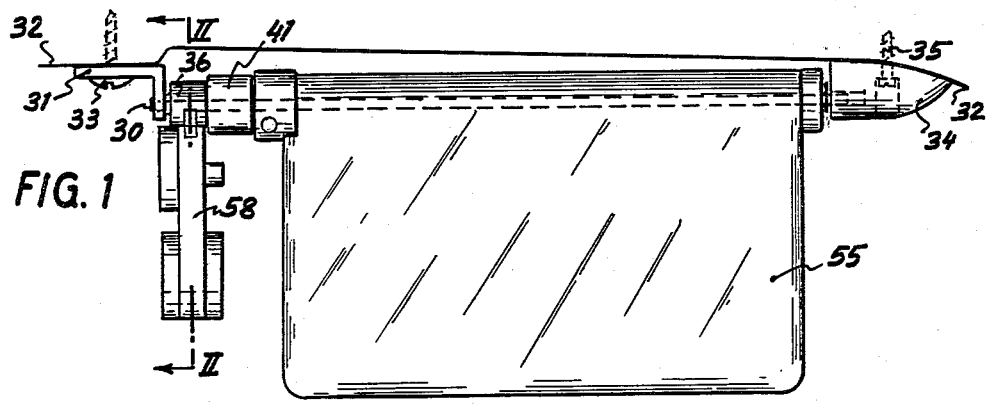
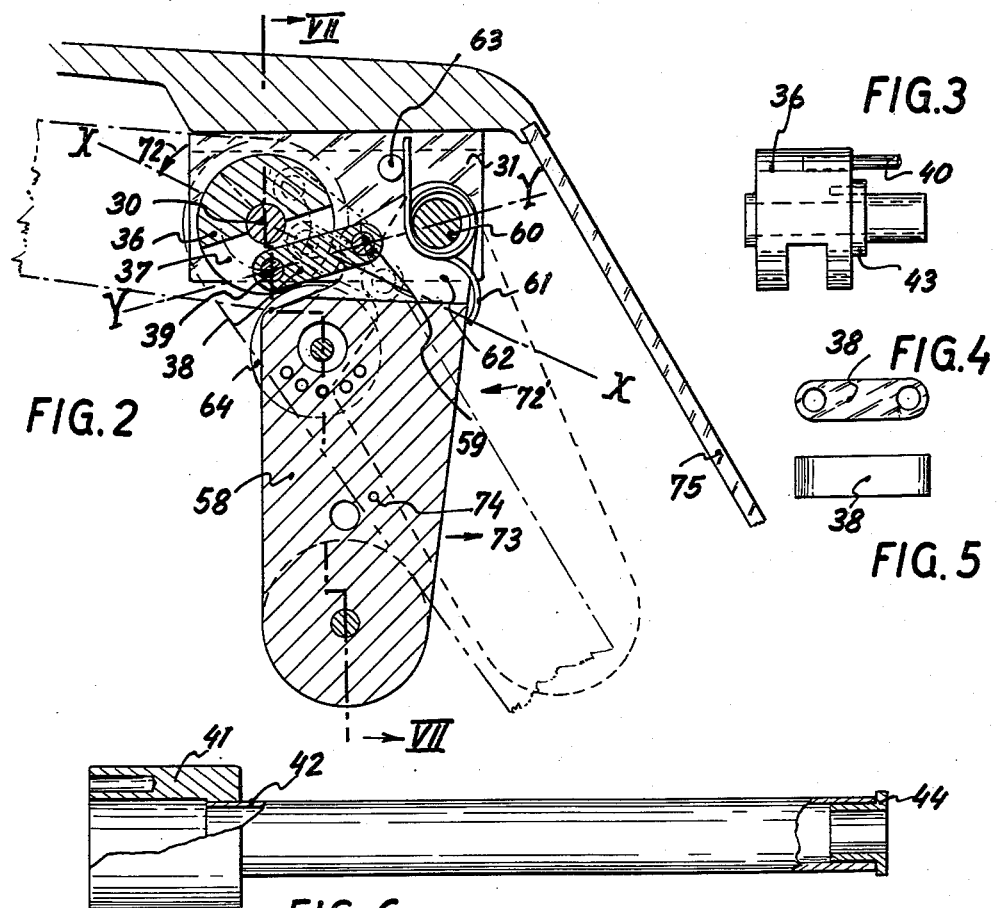
INVENTOR.
Heinrich von Wimmersperg
BY
Barnes, Kisselle, Raisch & Choate Jan. 21, 1964    H. VON WIMMERSPERG    3,118,700
SHOCK ABSORBING CRASH PAD Filed Feb. 24, 1961    3 Sheets-Sheet 2

INVENTOR.
Heinrich von Wimmersperg
BY
Barnes, Kisselle, Raisch & Choate

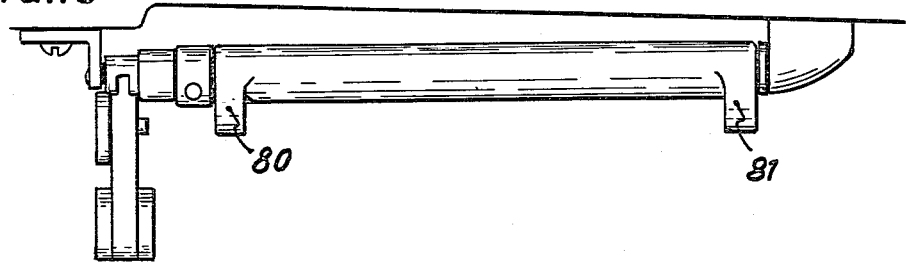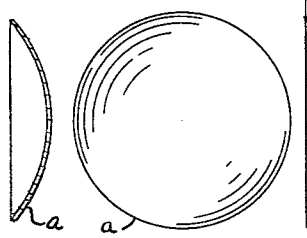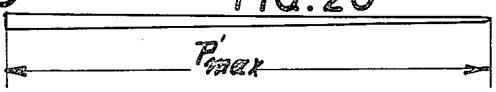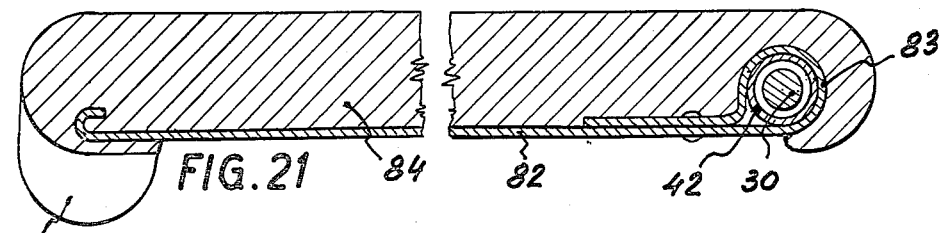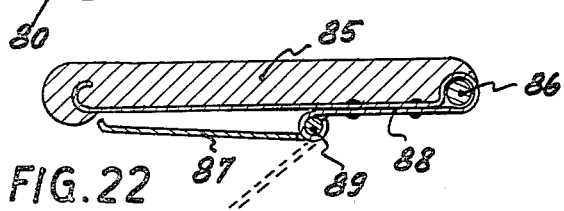

United States Patent Office 3,118,700
Patented Jan. 21, 1964

3,118,700
SHOCK ABSORBING CRASH PAD
Heinrich von Wimmersperg, 15929 Grand River Ave.,
Detroit, Mich.
Filed Feb. 24, 1961, Ser. No. 91,410
13 Claims. (Cl. 296—84)

In a sudden deceleration of a vehicle in a crash, the occupant continues in motion until his kinetic energy is transformed into deformation, sound and heat energy by impact. The object that stops his forward motion inflicts various degrees of injury. Especially dangerous is the front passenger seat of a car.

About 49% of all fatal injuries are head injuries. About one-third of all fatal injuries are inflicted to the passenger by the windshield area and about two-thirds by the instrument panel. Two general types of head injuries occur: (a) the head hits the windshield, often perforating it and afflicting severe lacerations to the face and ears as the head moves further over the jagged glass portion; (b) the head hits the windshield, afflicting some injuries in this impact, and moves further downward against the dash board, often with residual energy enough to crush the bones. As most of the latter type injuries are statistically counted as instrument panel injuries, the actual percentage of windshield injuries is higher than shown by figures. Any method of distributing the impact blow to a larger facial and head area and at the same time introducing a shock absorbing effect by deformation of the hit object instead of deformation of the face or head would greatly reduce the severity of injury in a crash. The brain is protected by the hard skull against direct damage by contact. It is obvious that a fracture of the skull can cause directly permanent injury. The smaller the skull area is, which has to transfer the total impact force of the head mass to the windshield, the more concentrated and higher the forces will be. The yielding surface of padding therefore distributes the impact forces to a larger area, thus reducing the peak forces and the danger of fracture to the bone structure.

However, the brain can be damaged as well by internal pressure concentration, without a fracture of the skull. When the skull decelerates, the brain continues in motion, pressure is built up, and a hydrostatic shock wave advances toward the skull and is reflected there. Further, the brain hits the many protruberances inside the skull and can be damaged. The total kinetic energy of the semi-fluid brain mass has to be changed into pressure, friction, heat energy and destruction of tissue in this decelerating process. If the rate of the speed change, the deceleration, is small, the pressure and other factors will be small. Therefore, it is essential that the time of deceleration and the displacement in the deceleration period will be increased. If a head hits a hard, heavy surface, the entire pressure-time phenomenon takes not more than five milliseconds, one two-hundreths of a second. This is about one-fourth of the shutter time of a conventional box camera. This shows how important it is to slow down masses gradually.

It is known to the art to pad the manually adjustable sunvisors for cars. But they protect the head of a passenger in the windshield area only in the rare cases where the visor is, at the time of impact, used in a lowered position for protection against the sun. This is not one percent of the total driving time. There is no time in a crash to lower the sunvisor manually.

The main object of the invention is to provide a crash pad which moves in a sudden deceleration automatically from a storage position outside of the windshield area into a position between windshield and head of the passenger.

A further object of the invention is to provide a crash pad according to the main object of the invention, which can be reset to the storage position manually, after it has been released in a sudden deceleration.

Another object of the invention is to provide a mechanism for release of crash pad which can be adjusted to a specific deceleration degree.

A further object of the invention is to combine a shock absorbing crash pad, which moves in a crash automatically from the storage position into a position between the windshield and the head of the passenger, with a sun visor, preferably manually adjustable.

It is another object of the invention to support the crash pad in a crash at its outer edges on the windshield in such a way that the center of the crash pad continues in motion, bending the frame of the crash pad, and absorbing thereby a certain amount of energy, until the center contacts the windshield.

A further object is to provide a crash pad which can easily be removed from the release device in order to adapt the crash pad to different types of vehicles and have one type of release device only.

It is another object of the invention to prevent a head striking the windshield area protected by the crash pad from glancing downwards against the dash board.

Figure 8:
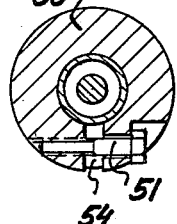
Figures 9, 10, 11, 12:
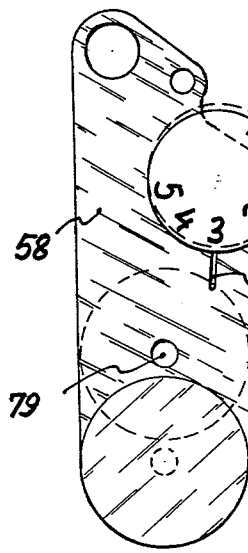

Further objects of the invention and novel features of the construction will be apparent from the following specification, when considered together with the accompanying drawings, in which:

FIG. 1 is a front view of the complete assembly for the right front seat of a car, the crash pad being released by a sudden stop, as seen by the passenger;
FIG. 2 is a section II—II of FIG. 1, enlarged;
FIG. 3 is a front view of the lock with pin;
FIG. 4 is a side view of the link;
FIG. 5 is a top view of the link;
FIG. 6 is a front view of the friction tube of the crash pad;
FIG. 7 is section VII—VII of FIG. 2, some parts shortened;
FIG. 8 is a section VIII—VIII of FIG. 7;
FIG. 9 is a side view of the release lever;
FIG. 10 is a front view of the release lever;
FIG. 11 is a cross section XI—XI of FIG. 7;
FIG. 12 is a cross section XII—XII of FIG. 7;
FIG. 13 is a front view of a second embodiment of the crash pad, in horizontal position;
FIG. 14 is a cross section of the crash pad according to FIG. 13, shown in released position, the head deforming the crash pad;
FIG. 15 shows the cross section of the area of contact of the skull at the maximal compression of the crash pad;
FIG. 16 shows the area of contact in frontal view;
FIG. 17 shows diagrammatically the distribution of the compression forces in this area over the cross section;
FIG. 18 shows in comparison with FIG. 15 the cross section of the skull contacting the windshield, if no crash pad is provided;
FIG. 19 shows the area of the same;
FIG. 20 shows in comparison with FIG. 17 the distribution of the compression forces over the not shielded skull area;
FIG. 21 shows the cross section of the second type of crash pad; and
FIG. 22 shows a third embodiment of the crash pad in cross section, having a separate sun visor, hinged to the crash pad.

The rod 30 is screwed into bracket 31, which is fastened to the windshield frame 32 by screw 33. The right end of the rod 30 is kept in its place by the shoe 34, fastened to the windshield frame 32 by screw 35. The lock 36 is hinged on rod 30. In the slot 37 of the lock 36, the link 38 is hinged on pin 39, which is mounted in lock 36. The pin 40 is rigidly mounted in a hole of lock 36 and couples the lock 36 to the head 41, which is rigidly fastened to the tube 42. The head 41 is guided on the rim 43 of lock 36. The right end of tube 42 is journalled on piece 44 mounted on rod 30. The spring ring 45 secures the assembly axially on the rod 30. The straight left end of the crash pad spring 46 is held in hole 47 of lock 36. The straight right end of the same spring is held in hole 48 of the ring 49 which is pinned to rod 30. The spring 46 biases the lock 36 in a counter-clockwise direction when seen from the right in FIG. 7.

The split ring 50 is mounted on tube 42. When the screw 51 is tightened, the ring is pressed together against the tube 42 and provides a friction clutch between the tube and the ring. The corner 52 of the crash pad frame 53, which is rotatably mounted on tube 42, fits into slot 54 of the split ring 50. The crash pad is made of shock absorbing material, enclosing the frame 53. The ring 56, tightened to tube 42 by set screw 57, provides a shoulder to keep the crash pad in its place on tube 42. The crash pad can be turned manually against the friction forces of the split ring 50, which are strong enough to hold the crash pad in the horizontal position.

One end of the link 38 is hinged to lock 36 by pin 39, the other end to the release lever 58 by pin 59. The release lever 58 is hinged to the bracket 31 by axle 60, which is a stud integral with bracket 31. The spring 61, located in slot 62 of the release lever 58, biases the release lever 58 clockwise, as seen in FIG. 2, as one end rests on the back of the release lever 58 and the other end on stud 63, which is part of the bracket 31. The dial 64 stops the rotation of the release lever by resting against the lock 36. The dial axis 65 is out of center with the dial rim so that any angular change of position of the dial changes the angular position of the release lever 58. One end of the spring 66 rests in the hole 67 of the release lever 58, the other end on the ring 68 pinned to the dial axis 65. The little pin 69 in the dial 64 is forced into one of the holes 70 arranged in a circle on release lever 58 by the force of spring 66. When the ring 68 is pressed inwards, the dial can be turned and the pin can be placed into another hole, securing the dial anew. Markings on the dial coacting with a reference index 71 on the release lever 58 (FIG. 9) show the position of the dial.

FIG. 2 shows the position of the release lever assembly in the storage position, the crash pad spring 46 being cocked, trying to turn the lock 36 in the direction of the arrow 72. But the link pin 39 and the link pin 59 are in a line with the axle 60 forming a toggle joint, thereby preventing rotation of the lock 36 (line Y—Y in FIG. 2). The release lever spring 61 biases the lever in the direction of the arrow 72′, overcoming the weight of the release lever. As the lock 36 is coupled to the head 41 with its tube 42 by pin 40, the head 41 and the tube 42 are also prevented from rotation. In this cocked position of the locking device, the crash pad 55 can be turned against the friction of the split ring 50 to any position and used in the conventional way as a sun visor. The broken lines in FIG. 2 show the crash pad in horizontal position (storage position) and also in vertical position (sun visor position or acting as crash pad).

When the vehicle moving in the direction of arrow 73 is suddenly decelerated, the center of gravity of the release lever 58, designated 74 in FIG. 2, continues in motion and turns lever 50 counterclockwise against spring 61. The toggle joint axles are not in line anymore and the lock starts to rotate. If the crash pad was in its horizontal position, it swings downwards toward the windshield. Three forces are working at this moment to turn the crash pad: the pull of the link by the release lever 58 turning in direction of arrow 72; the weight of the crash pad; and the tension of the spring 46. After the center of gravity of the crash pad has reached a position below the horizontal plane including the rod, the inertia forces of the crash pad are helping also to turn the crash pad into the shielding position. When the release lever 58 reaches the position shown by dotted lines in FIG. 2, it reverses its motion. The axles of the toggle joint are all in line X—X, the crash pad in almost vertical position. The lock continues to rotate until it reaches its end position (the link in this position being shown by broken lines and the lever returned to its original position being shown in full lines). At the end of this period, the crash pad and the lever make small oscillating movements, until the head of the passenger hits the crash pad and forces it against the windshield glass 75. The shock absorbing padding of the crash pad is compressed and adsorbs the kinetic energy on a relatively large skull area, reducing the danger of injuries.

The deceleration necessary to break the toggle joint can be adjusted by turning the dial to different positions and thus changing the relative positions of the axles of the toggle joint 39, 59 and 60. In spite of the sensitivity of this adjusting device, all locking surfaces are relatively large. Wear does practically not affect the rate of sensitivity to deceleration, as it would be the case of a ratchet type of lock.

Instead of changing the sensitivity of the release by changing the relative position of the toggle joint axles, a shift of the center of gravity of the release lever can be used. The shaft 76 of the weight 77 can be placed either in hole 78 (as shown in FIG. 7) or in hole 79 of the release lever 58 and secured by the weight 80 by means of a threaded portion. The position shown in the FIG. 7 is the more sensitive position. A third method is to change the masses of the weights 77 and 80. Another way is to change the force of the spring 61. When the positions of the toggle joint axles 39, 59 and 60 deviate from the straight line Y—Y, the weight of the crash pad and the tension of the spring 46 influence the sensitivity of the release also.

Another embodiment of the invention is shown in FIGS. 13, 14 and 21. The crash pad has two short bumpers 80 and 81, preferably constructed from a soft, non-rebounding material, in the two corners opposite the rod 30. The bumpers can be molded from the padding material and be integral with the padding. The frame 82 is made from material with very little or no rebound. The end 83 is tightly rolled over the tube 42 and produces a sort of friction clutch. The padding 84 is molded onto the frame 82. FIG. 14 shows this embodiment in action. The broken lines show the skull of the passenger just contacting the crash pad. The bumpers 80 and 81 prevent further rotation of the crash pad as they are forced against the windshield. Continuing in motion, the head compresses the padding of the crash pad, then bends the frame 82 and finally finds greater resistance when the frame touches the windshield 75. The drawing shows two important factors: first, the increase of shock absorbing area of the skull. FIG. 15 shows the cross-section of the skull portion a absorbing the impact while FIG. 16 shows the top view of this area. As the blow is distributed over such a large area, the specific compression forces, shown in FIG. 17 and designated diagrammatically as P max. are low. Second, instead of having a hard, sudden impact on the windshield, the head decelerates a relatively long way. First it is dampened by the pad. Then the frame 82 is bent and absorbs another portion of the energy of the head. The total displacement during deceleration is A (FIG. 14). If not all of the kinetic energy of the head is absorbed, the head continues in motion, and will probably break the windshield. But the danger of total injury is now greatly reduced, as a very great portion of the energy is already absorbed and as the head is well shielded. Actually, in some way, it helps to add to the deceleration displacement, so that the peak force will not be as high as it would be striking on a completely rigid structure. This dual effect of distributing the forces to a bigger skull area and increasing the deceleration displacement produces a considerable safeguard. The deep padding combined with the bending of the frame during impact also decreases the danger of glancing downwards from the windshield onto the top of the dash board.

A third embodiment of the invention is shown in FIG. 22. The crash pad and visor are separated. The crash pad 85 is hinged for free movement to the rod 86 which is rigidly fastened to the windshield frame. The crash pad is locked directly to the rod or rod bracket as shown in the first embodiment without the use of the friction clutch device. The release is achieved in the same manner as described in the first embodiment. The independent sun visor 87 is hinged to the crash pad frame 88 and can be adjusted manually against the force of the friction of the visor on the hinge 89. A sudden deceleration of the vehicle releases the lock and crash pad.

In all embodiments, the crash pad can be reset and locked in the horizontal position by lifting it manually. It is, of course, possible to use the crash pad without any combination of sun visor; and its use is not limited to the front seat of a car. In comparison to the gradual deceleration of the head on a crash pad according to the invention, a direct, hard impact of the head on the windshield is very dangerous. The unshielded skull would hit the windshield over a very small area of about a quarter of an inch in diameter. The specific compression force would be several hundred times higher than on the crash pad. The glass and the skull permit only very little elastic deformation before they break. The fracture of the glass and/or of the skull cause extremely severe injuries. In case of impact without the pad of this invention, the participating section of the skull is designated a' and is shown in cross section in FIG. 18 and in plan in FIG. 19 the specific compression forces the skull has to absorb in this case is illustrated in FIG. 20 and designated P' max. The compression wave in the brain is thus very severe, as there is no dampening of the blow.

Even if a lap or safety belt is used for the front seat passenger, the crash pad of this invention is still useful. The lap belt restrains only the lap portion of the body. The upper part continues in motion to a certain extent. The head can still contact the windshield or dash board if they are near enough as in small cars.

It will be understood that other means of moving the crash pad into the crash area and other means of holding it in the storage position and other means of releasing it into the crash position may be used without departing from the spirit and scope of the invention as herein disclosed.

I claim:

1. A shock absorber for vehicles, comprising a bracket rigidly fastened to the vehicle, a rod rigidly fastened to the bracket, a clutch member journalled on the rod, a crash pad frictionally journalled on the clutch member and manually swingable thereon, a lock member connected to the clutch member and journalled on the rod, said lock member being adapted to lock the clutch member in a storage position, a link rotatably mounted on the lock member with its axis of rotation spaced from the axis of the rod, a release member rotatably mounted on the bracket with its axis of rotation being spaced from and substantially parallel to the axis of the rod, and being pivotally connected to the link, said release member coacting with the link to form a toggle connection between said bracket and lock member to thereby lock the lock member in an inoperative position of the crash pad and adapted to unlock the lock member by the force of inertia in a sudden deceleration of the vehicle, a spring biasing the release member into the direction of its locking position and a spring biasing the lock member into its released position.

2. A shock absorber for vehicles according to claim 1 including a manually adjustable stop for determining the locking position of the release member and thereby controlling the alignment of the toggle in the locked position of the assembly.

3. A shock absorber for vehicles, comprising a bracket rigidly fastened to the vehicle, a rod rigidly fastened to the bracket, a lock member journalled on said rod, a crash pad journalled on the rod and connected to the lock member by a friction device, said crash pad being adapted to be manually adjusted relative to the lock member by overcoming the effect of said friction member, a link pivoted at one end to the lock member with its pivotal axis being spaced from the axis of the rod, a release member rotatably mounted on the bracket with its axis of rotation being spaced from and substantially parallel to the axis of the rod, said release member being pivotally connected to the other end of the link and cooperating with the link to form a toggle adapted to lock the lock member in the inoperative position of the crash pad and adapted to unlock the lock member by the force of inertia in a fast deceleration of the vehicle, and a spring biasing the release member in the direction of its locking position.

4. A shock absorber for vehicles according to claim 3 having a manually adjustable stop adapted to stop the movement of the axis of the pivotal connection between the link and the release member in the locking position of the lock for determining the locked position of the release member and thereby controlling the alignment of the toggle in the locked position of the assembly.

5. A shock absorber for vehicles according to claim 3 having a weight mounted on the release which is adjustable in a direction toward and away from the axis of the rod.

6. An adjustable sun visor for vehicles comprising a visor pivotally supported on the vehicle, a clutch device movably mounted on the vehicle and adapted to hold said visor in manually adjusted positions, said clutch being movable from a storage position of the visor to an operative position of the visor, a mount rigidly fastened to the vehicle and adapted to guide movement of said clutch from said storage position to said operative position of the visor, a locking device adapted to lock said clutch device in said storage position of the visor, an inertia-operated release device adapted to unlock said lock device in response to fast deceleration of the vehicle and thereby permit movement of the visor from the storage position to the operative position.

7. An adjustable sun visor according to claim 6 including a spring biasing the visor to move in the direction of the operative position.

8. A shock absorber for vehicles comprising a crash pad, means for mounting the crash pad for swinging movement from a storage position to an operative position, a locking device for retaining the crash pad in storage position, an inertia operated device responsive to rapid deceleration of the vehicle for releasing said locking device, said inertia operated device being supported for pivotal movement about an axis spaced from the swinging axis of the crash pad and having a driving connection with the cash pad for assisting swinging movement of the crash pad to said operative position in response to sudden deceleration of the vehicle.

9. A shock absorber for vehicles according to claim 8 wherein said driving connection includes a link operably connected at its opposite end to said inertia operated means and said crash pad.

10. A shock absorber for vehicles comprising a support, a crash pad mounted on said support for swinging movement between storage and operative positions, a clutch interposed between the support and the crash pad for enabling the crash pad to be manually adjusted between said storage and operative positions for use as a sun visor, said clutch being itself rotatable to swing the crash pad between said storage and operative positions, means for locking the clutch against rotation for retaining the crash pad in the storage position, said locking means including an inertia operated device connected to the clutch and adapted to rotate the clutch and thereby the visor to said operative position in response to sudden deceleration of the vehicle.

11. A shock absorber for vehicles comprising, a crash pad, means for mounting said crash pad for movement from a storage position to an operative position, a locking device adapted to lock the crash pad in said storage position and an inertia-operated release device adapted to release said locking device when the car decelerates suddenly to permit movement of the crash pad from said storage to said operative position, said inertia-operated release device including a weight member responsive to sudden deceleration of the car to assist movement of the crash pad to said operative position, said inertia-operated release device comprising a toggle linkage connected at one end to said locking device and at its other end to the mounting means for the crash pad and said weight member comprising one link of said toggle linkage, said locking device having a driving connection with said crash pad.

12. A shock absorber for vehicles, comprising a crash pad, means for mounting said crash pad for movement from a storage position to an operative position, a locking device adapted to lock the crash pad in said storage position, and an inertia-operated release device adapted to release said locking device when the car decelerates suddenly to permit movement of the crash pad from said storage to said operative position, said inertia-operated device being drivingly connected to the crash pad to assist movement of the crash pad to the operative position, said inertia-operated release device comprising a toggle linkage, one link of said toggle linkage comprising a weighted member, the other link of the toggle linkage being connected at one end to the weighted member and at its other end to said locking device, said locking device being connected with the crash pad to shift the crash pad to said operative position when released.

13. A shock absorber assembly for vehicles comprising a support, a visor mounted for pivotal movement on said support, said visor comprising a crash pad, a clutch device acting between the visor and the support and adapted to hold the visor in manually adjusted positions on said support, said visor being movable on said support between storage and operative positions, mounting means adapted to be secured to the vehicle, said support being pivotally mounted on said mounting means for swinging movement of the visor and the support as a unit between said operative and storage positions of the visor, a locking device engageable with said support for locking the support in said storage position and inertia-operated means for releasing said locking device to permit said support and visor to swing to said operative position in response to sudden deceleration of the vehicle.

References Cited in the file of this patent

UNITED STATES PATENTS

| 2,050,141 | Wethington | Aug. 4, 1936 |
| 2,806,737 | Maxwell | Sept. 17, 1957 |

FOREIGN PATENTS

| 1,031,160 | France | Mar. 18, 1953 |
| 964,471 | Germany | May 23, 1957 |